(12) United States Patent
Masaki

(10) Patent No.: US 7,304,763 B2
(45) Date of Patent: Dec. 4, 2007

(54) IMAGE PROCESSING APPARATUS AND METHOD

(75) Inventor: Tomoaki Masaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 10/442,086

(22) Filed: May 21, 2003

(65) Prior Publication Data

US 2003/0218774 A1    Nov. 27, 2003

(30) Foreign Application Priority Data

May 22, 2002 (JP) .............................. 2002-147999
May 13, 2003 (JP) .............................. 2003-134742

(51) Int. Cl.
*G06F 3/12* (2006.01)

(52) U.S. Cl. ....................... 358/1.16; 358/1.2; 358/448

(58) Field of Classification Search ................ 358/505, 358/1.18, 2.1, 3.13, 3.28, 535, 539, 1.15, 358/451, 1.16; 345/204, 212, 213; 382/260, 382/274, 300, 47; 395/102
See application file for complete search history.

(56) References Cited

U.S. PATENT DOCUMENTS

| | | | |
|---|---|---|---|
| 5,335,295 A * | 8/1994 | Ferracini et al. | 382/298 |
| 5,901,274 A * | 5/1999 | Oh | 358/1.2 |
| 6,373,589 B2 | 4/2002 | Masaki | 358/1.17 |
| 6,611,260 B1 * | 8/2003 | Greenberg et al. | 345/204 |
| 6,859,289 B1 * | 2/2005 | Walmsley | 358/1.18 |
| 6,941,025 B2 * | 9/2005 | Greenfield et al. | 382/260 |
| 2001/0033392 A1 * | 10/2001 | Utsunomiya | 358/1.15 |

FOREIGN PATENT DOCUMENTS

JP    9-179968    7/1997

\* cited by examiner

*Primary Examiner*—King Y. Poon
*Assistant Examiner*—Allen Nguyen
(74) *Attorney, Agent, or Firm*—Fitzpatrick, Cella, Harper & Scinto

(57) ABSTRACT

Sets of pixel data obtained by dividing entered image data into a predetermined number of items of data are stored in storage means in a predetermined order, and conversion processing is executed for obtaining individual items of pixel data of an output image by applying predetermined processing to the stored pixel data. When the conversion processing is executed, it is determined whether a set of pixel data to be stored in the storage means next is used in conversion processing, and control is carried out in such a manner that a set of pixel data determined not to be used in conversion processing will not be stored in the storage means. As a result, processing for storing unnecessary data not used in conversion processing can be eliminated, thereby making it possible to raise the overall speed of image processing.

6 Claims, 14 Drawing Sheets

INPUT-PIXEL DATA VALUE     A B C D
OUTPUT-PIXEL DATA VALUE     P

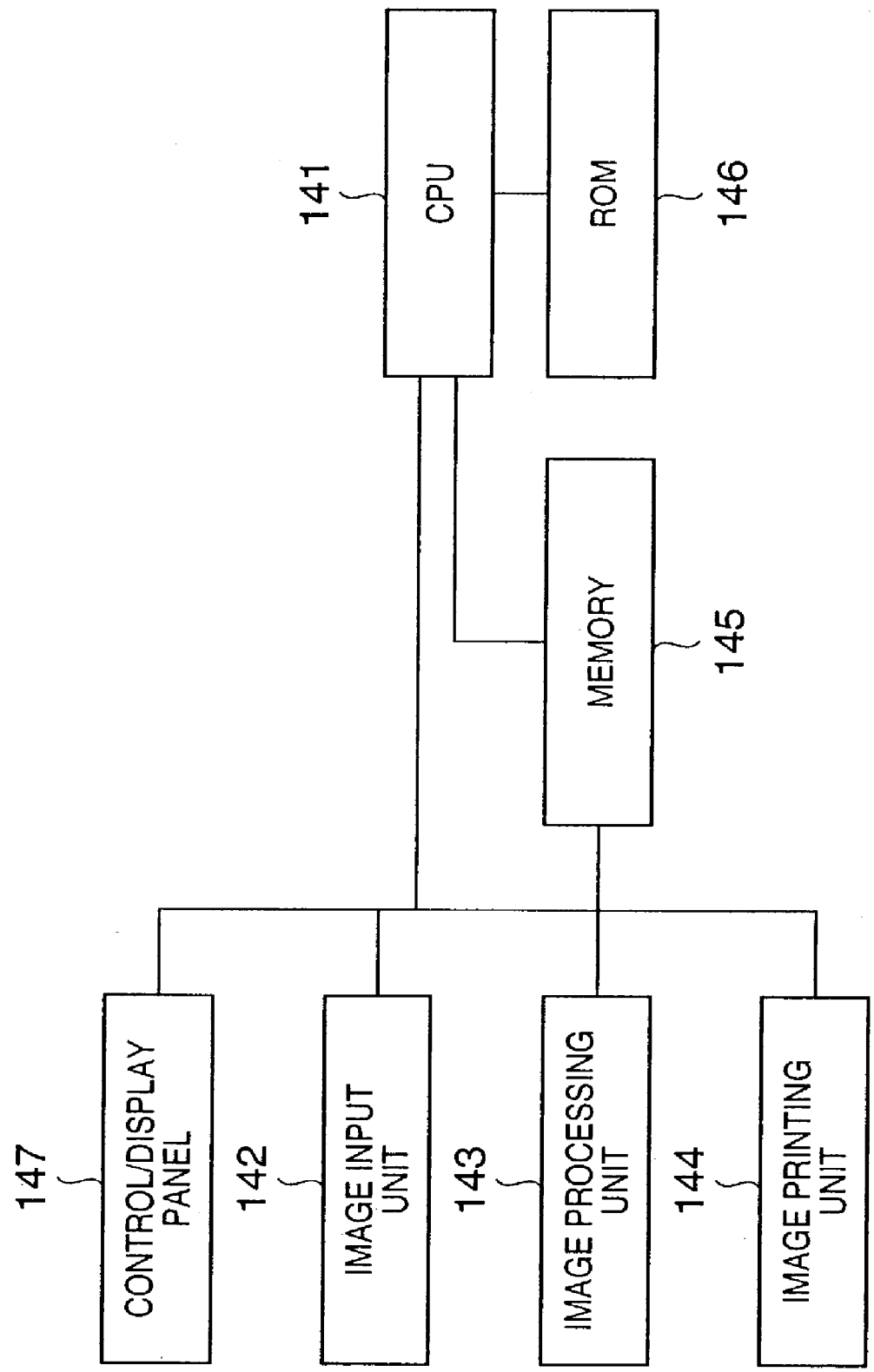

IMAGE PROCESSING APPARATUS AND METHOD

FIELD OF THE INVENTION

This invention relates to an image processing apparatus and method. More particularly, the invention relates to an image processing apparatus and method in which image data that prevails prior to conversion processing such as processing for resolution conversion or scaling conversion is stored in a buffer.

BACKGROUND OF THE INVENTION

As personal information processing devices such as personal computers are furnished with greater functionality, there is greater demand for image input devices such as scanners and digital cameras that convert image data such as photographs to digital data and load the digital data.

An ordinary scanner is equipped with an photoelectric transducer such as a CCD for reading image data. The scanner is so adapted that a read RGB analog image signal is subjected to suitable processing and then converted to digital data, with the data being output upon being stored in a buffer or the like.

An image processing circuit for binarizing multivalued image data that has been read comprises an input masking circuit for converting read RGB data on a per-pixel basis to data on a per-line basis and storing the data in a first buffer; a filter processing circuit for reading out data from the first buffer, applying edge emphasis and smoothing processing and storing the resultant data in a second buffer; a scaling processing circuit for reading out data from the second buffer and executing a resolution conversion and scaling conversion; a binarizing circuit for subjecting data, which is output from the scaling processing circuit, to logarithmic conversion, black-color extraction, gamma conversion and binarization (or multivalue conversion), and storing the resultant data in a third buffer; and an output interface circuit for reading out data from the third buffer and outputting the data to a device connected to a succeeding stage.

In processing according to the prior art, all data that has been input to the input masking circuit is processed by the input masking circuit and filter processing circuit, and the processed data is stored in the second buffer.

The scaling processing circuit interpolates (e.g., by linear interpolation) input image data that has been read out from the second buffer, thereby obtaining an output value. FIG. 8 illustrates the manner in which output data is obtained from input data in the vicinity of a desired output image position. In FIG. 8, the value of output pixel data P is represented by a function of input pixel data A, B, C, D at four points surrounding this pixel, spacing L between the input pixels in the main-scan direction and spacing Ls between the input pixels in the sub-scan direction, and distance from one point among the four points of the input pixels to the output pixel (namely distance n along the main-scan direction and distance m along the sub-scan direction).

If resolution is lowered or size reduced by the scaling processing circuit, there are cases where unnecessary input data not used in processing in order to obtain a desired output value is generated. For example, if processing for reducing size by 33.3% is executed, one pixel of unnecessary input data will be produced for every three pixels in the main-scan direction and one line of unnecessary data will be produced for every three lines in the sub-scan direction.

However, since all data is processed by the filter processing circuit in the conventional image processing circuit as mentioned above, the filter processing circuit executes processing for storing data in the second buffer unconditionally even though the data may not be necessary in the scaling processing circuit.

Accordingly, processing executed by circuits from the scaling processing circuit onward is required to wait until the filter processing circuit finishes storing the unnecessary data and storage of the next item of effective data is completed. As a consequence, processing speed declines owing to needless waiting time.

SUMMARY OF THE INVENTION

An object of the present invention is to provide an image processing apparatus in which processing for storing data not used in conversion processing is eliminated so that overall processing time can be shortened.

Another object of the present invention is to provide an image processing method in which processing for storing data not used in conversion processing is eliminated so that overall processing time can be shortened.

According to one aspect of the present invention, the foregoing objects are attained by providing an image processing apparatus comprising, storage means for storing pixel data, storage processing means for storing sets of pixel data, which are obtained by dividing entered image data into a predetermined number of items of data, in the storage means in a predetermined order, conversion means for subjecting the pixel data, which have been stored in the storage means, to predetermined processing, thereby obtaining individual items of pixel data of an output image, determination means for determining whether a set of the pixel data to be stored next in the storage means in accordance with the predetermined order will be used by the conversion means, and storage control means for controlling the storage processing means in such a manner that the set of pixel data will not be stored in the storage means in a case where the determination means has determined that the set of pixel data will not be used by the conversion means.

According to another aspect of the present invention, the foregoing objects are attained by providing an image processing method comprising a storage processing step of storing sets of pixel data, which are obtained by dividing entered image data into a predetermined number of items of data, in storage means in a predetermined order, a conversion step of subjecting the pixel data, which have been stored in the storage means, to predetermined processing, thereby obtaining individual items of pixel data of an output image, a determination step of determining whether a set of the pixel data to be stored next in the storage means in accordance with the predetermined order will be used by the conversion step, and a storage control step of controlling the storage processing means in such a manner that the set of pixel data will not be stored in the storage means in a case where the determination step has determined that the set of pixel data will not be used by the conversion step.

Thus, sets of pixel data obtained by dividing entered image data into a predetermined number of items of data are stored in storage means in a predetermined order, and conversion processing is executed for obtaining individual items of pixel data of an output image by applying predetermined processing to the stored pixel data. When the conversion processing is executed, it is determined whether a set of pixel data to be stored in the storage means next is used in conversion processing, and control is carried out in such a manner that a set of pixel data determined not to be used in conversion processing will not be stored in the storage means.

Accordingly, processing for storing unnecessary data not used in conversion processing can be eliminated, thereby making it possible to raise the overall speed of image processing.

The determination means and the storage control means may be provided within the conversion means, within the storage processing means, or within the conversion means and within the storage processing means.

The set of pixel data may comprise pixel data in one line of an input image.

Preferably, the determination means determines whether the set of pixel data to be stored next will by used by the conversion means based upon a positional relationship of pixel data used by the conversion means in the predetermined processing.

Preferably, the determination means obtains the set of pixel data used next by the conversion means. The predetermined processing may include processing for changing magnification of an input image, or processing for converting resolution of an input image.

According to still another aspect of the present invention, the foregoing objects are attained by providing an image processing apparatus for applying image processing to image data entered from pixel input means, and outputting processed image data to printing means, said apparatus comprising first storage means having r-number of line memories, first storage control means for storing data in the r-number of line memories in order, filter means, to which data read out from the r-number of line memories is input, for subjecting the data to filter processing, second storage means having s-number of line memories for storing data that has undergone the filter processing, second storage control means for storing data in the s-number of line memories in order whenever the filter processing is executed, and scaling means responsive to a command from the filter means for applying scaling processing to data read out from the second storage means, wherein the scaling means outputs a command to omit filter processing of data of a prescribed line based upon magnification.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a block diagram useful in describing an image processing unit, an image input unit and an image printing unit.

DETAILED DESCRIPTION OF THE PREFERRED EMBODIMENTS

Preferred embodiments of the present invention will now be described in detail in accordance with the accompanying drawings.

First Embodiment

Figure 1:
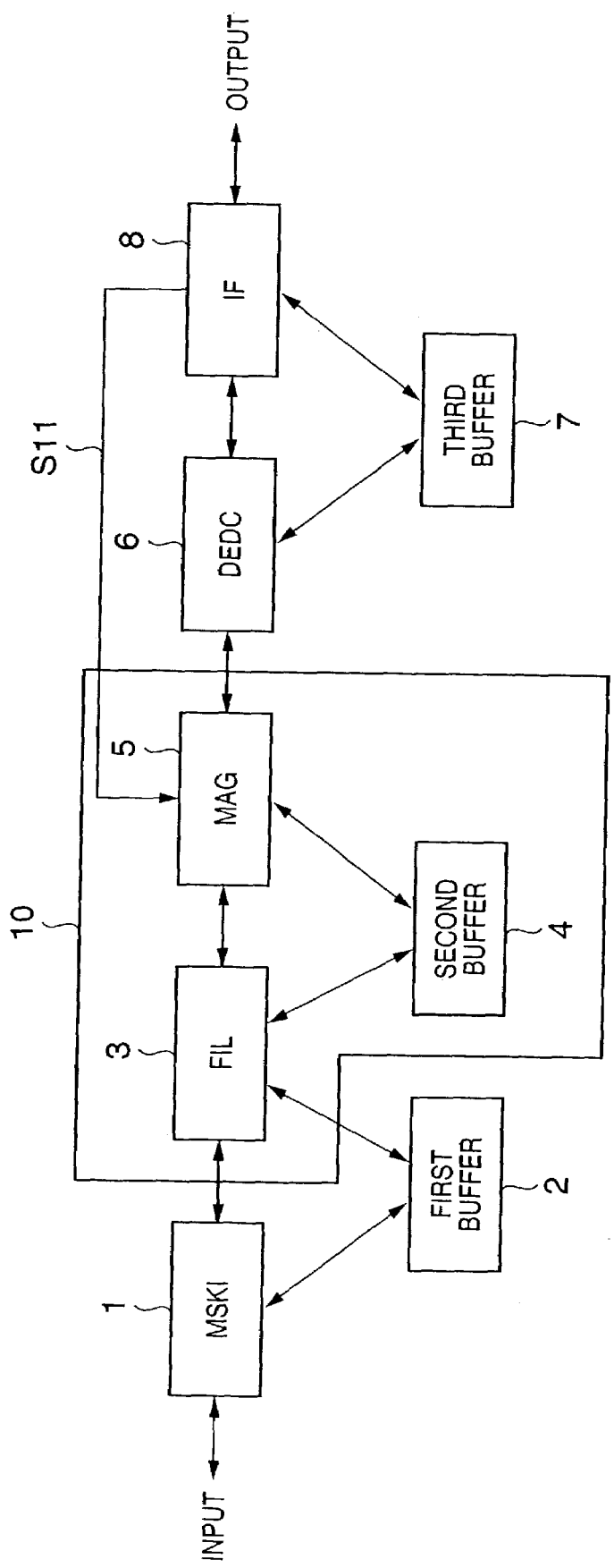
FIG. 1 is a block diagram illustrating the structure of a first embodiment of an image processing apparatus according to the present invention.

FIG. 1 is a block diagram illustrating the structure of a first embodiment of an image processing apparatus according to the present invention.

An image data processing apparatus according to this embodiment comprises an input masking circuit (MSKI) 1 for correcting entered RGB data, a first buffer (filter buffer) 2, a filter processing circuit (FIL) 3, a second buffer (scaling buffer) 4, a scaling processing circuit (MAG) 5, a DEDC block 6, a third buffer (output buffer) 7 and an interface (IF) 8.

The entered data is image data read by an image input unit. This data is composed of color components R, G, B each having a bit width of eight bits. The output destination of the processed data is an image printing unit. The output data is data in the packed-bit format.

FIG. 14 is a diagram useful in describing an image processing unit 143, an image input unit 142 and an image printing unit 144. The image input unit 142 is, e.g., a scanner equipped with a line sensor and having a resolution of 600 dpi×1200 dpi.

The image printing unit 144 is a printer or printer engine the resolution of which is, for example, 360 dpi×360 dpi.

The image processing unit 143 comprises the input masking circuit 1, filter processing circuit 3, scaling processing circuit 5, DEDC block 6 and interface (output means) 8 shown in FIG. 1. The image processing unit 143 is implemented as a single chip in the form of an ASIC. A memory 145 has the first buffer 2, second buffer 4, third buffer 7 and a working area for a CPU 141. The CPU 141 controls the image processing unit 143.

A control/display panel 147 is capable of setting resolution conversion and scaling. The CPU 141 executes processing associated with the control/display panel and communicates with the image input unit 142 and image printing unit 144, etc.

RGB data on a per-pixel basis read by reading means such as a CCD is input to the input masking circuit 1 in sync with a synchronizing signal when a data-transmit request signal is output from the input masking circuit 1. The input masking circuit 1 stores the received data successively in the first buffer 2. When storage of one line (one raster) of data in the first buffer 2 is completed, the input masking circuit 1 transmits a start-up signal to the filter processing circuit 3. If data of a number of dots in the sub-scan direction necessary for filter processing has been stored in the first buffer 2, the filter processing circuit 3 reads out data from the first buffer 2 and subjects this data to processing. For example, if the filter processing circuit 3 executes processing using a matrix composed of 5×5 pixels vertically and horizontally, respectively, the filter processing circuit 3 ignores the start-up signal from the input masking circuit 1 until five lines of data are stored in the first buffer 2.

The filter processing circuit 3 stores the data for which processing has been completed in the second buffer 4. When storage of two lines of data is completed, the filter processing circuit 3 transmits a start-up signal to the scaling processing circuit 5. The scaling processing circuit 5 performs control so as to transmit a BUSY signal to the filter processing circuit 3 from start to end of processing, as a result of which the filter processing circuit 3 does not write the next line of data to the second buffer 4.

Figure 10:
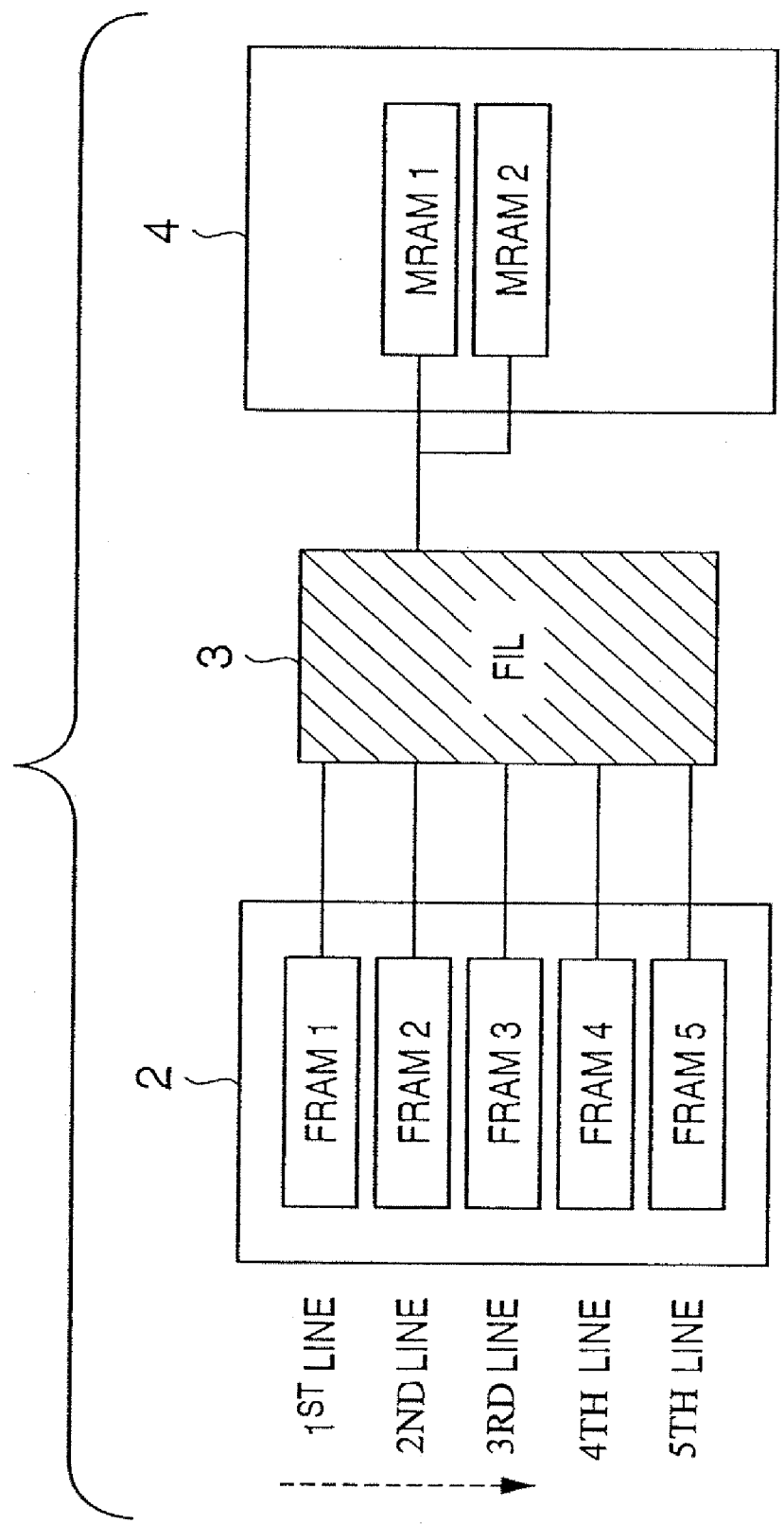
FIG. 10 is a block diagram showing a storage structure of data.

FIG. 10 is a diagram showing a storage structure of data in the first buffer 2, filter circuit 3 and second buffer 4. The FRAMES 1 to 5 in the first buffer 2 are 24-bit memories. R, G, B data each having a bit width of eight bits can be stored in each of FRAMES 1 to 5. The FRAMES 1 to 5 each has a size equal to that of the maximum scanning width.

Data of first to fifth lines is input to the FRAMES 1 to 5, respectively, of the first buffer 2, and the data is subjected to filter processing in the filter processing circuit 3. The result of processing is stored in an MRAM 1 of the second buffer 4.

Next, data of the sixth line is stored in FRAME 1. The data of the second to sixth lines is processed by the filter processing circuit 3 and the result is stored in an MRAM 2 of the second buffer 4. Next, data of the third line is stored in FRAME 2. The data of the third to seventh lines is processed by the filter processing circuit 3 and the result is stored in the MRAM 1 of the second buffer 4.

The MRAMs 1, 2 in the second buffer 4 are 24-bit memories in each of which R, G, B data each having a bit width of eight bits can be stored. The data stored is of the maximum scanning width.

The scaling processing circuit 5 reads out data from the second buffer 4 successively one pixel at a time, processes the data and transfers the processed data to the DEDC block 6 whenever one pixel is processed. The scaling processing circuit 5 outputs a request signal (REQ signal) to the DEDC block 6 and, if an ACK signal output by the DEDC block 6 is received, executes processing of the next pixel.

The DEDC block 6 executes, in the order mentioned, logarithmic conversion processing for converting RGB data to CMY data, output masking processing for converting CMY data to CMYK data, gamma conversion processing and binarization processing.

The binarized data is stored in the third buffer 7. The third buffer 7 is a memory having a bit width of 32 bits. Four lines of C, M, Y, K data each having a bit width of eight bits can be stored in the third buffer 7. The data stored is of the maximum scanning width (one line).

When one line of data is stored with regard to the stored data of each color (C, M, Y, K), the respective items of data are packed via the interface 8. One line of data is output to the image printing unit. It should be noted that if the third buffer 7 is filled with data, the interface 8 outputs the BUSY signal to the scaling processing circuit 5 in order to suspend conversion processing in the scaling processing circuit 5 (see S11 in FIG. 1).

Figure 13:
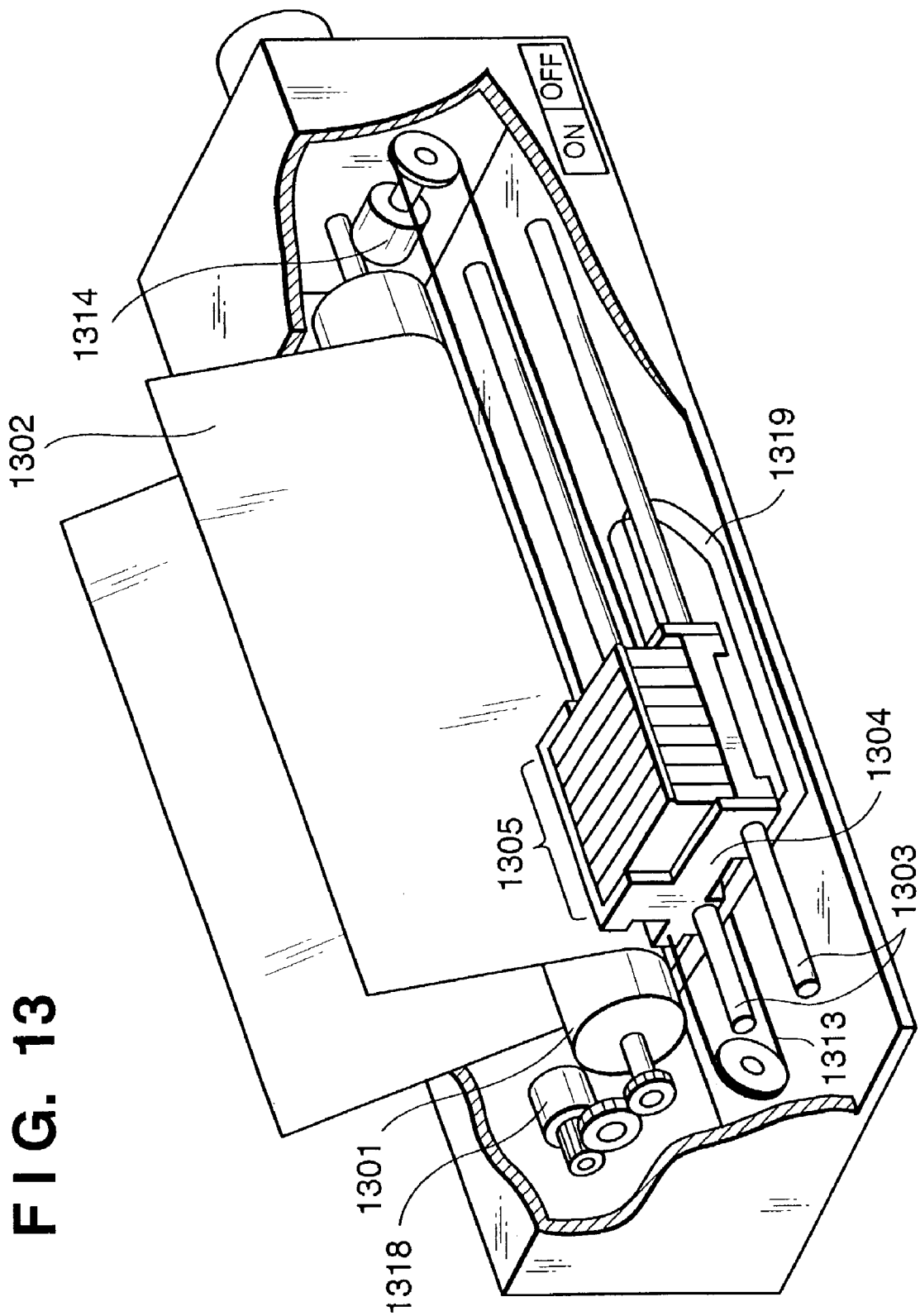
FIG. 13 is a perspective view illustrating the structure of a printer.

An overview of the image printing unit (printer) will be described with reference to FIG. 13. The printer has a printhead 1305 mounted on a carriage 1304 and movable back and forth along a shaft 1303 in the longitudinal direction (main-scan direction). Ink ejected from the printhead reaches a print medium 1302 that is spaced a very short distance away from the printhead and that has its printing surface regulated by a platen 1301, whereby an image is formed on the print medium.

The printhead is supplied via a flexible cable 1319 with an ink ejection signal in accordance with image data. A carriage motor 1314 scans the carriage 1304 along the shaft 1303, and a wire 1313 transfers the driving force of the motor 1314 to the carriage 1304. A transfer motor 1318 is coupled to a platen roller 1301 to transfer the print medium 1302.

The resolution of the printhead is 360 dpi. The printhead, which is of the ink-jet type, has an array of 320 printing elements for black (K) ink and an array of 128 elements for each of C, M, Y ink. Accordingly, printing equivalent to a maximum of 320 rasters can be performed by a single scan with regard to the black ink, by way of example.

Each print element comprises a driving portion and a nozzle. The driving portion is capable of applying heat to ink by means of a heater. The ink undergoes film boiling owing to the heat and ink is ejected from the nozzles owing to a change in pressure produced by the growth and shrinkage of air bubbles ascribable to film boiling.

Figure 11:
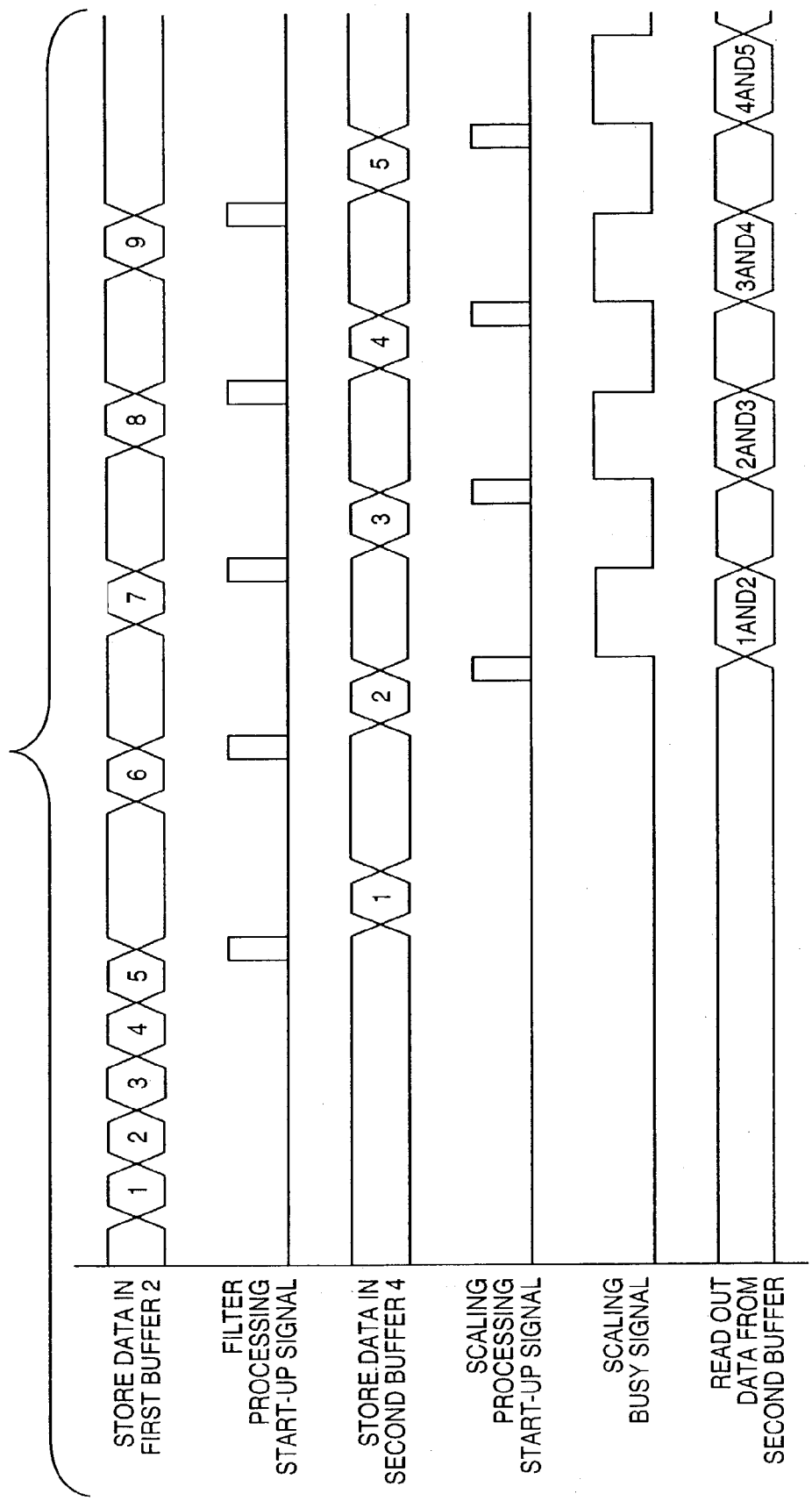
FIG. 11 is a time chart illustrating a case where a size reduction rate is 50% or greater.
Figure 12:
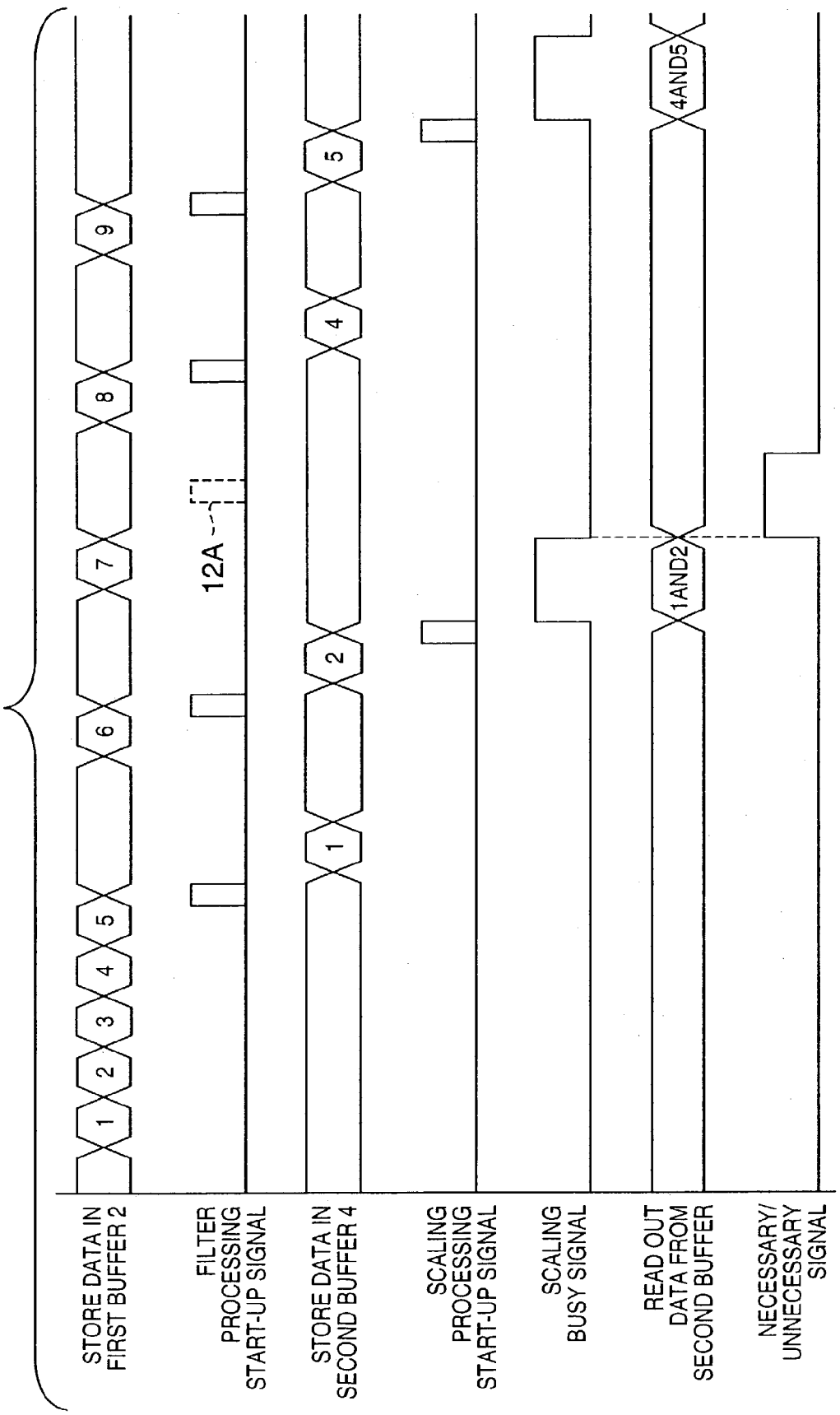
FIG. 12 is a time chart illustrating a case where a size reduction rate is less than 50%.

FIGS. 11 and 12 are diagrams showing the timing of each process. FIG. 11 illustrates a case where the reduction rate is 50% or greater, and FIG. 12 illustrates a case where the reduction rate is less than 50% (e.g., 25%, 33.3%). Upon completing the processing of one line, the scaling processing circuit 5 cancels the previous BUSY signal and prompts the filter processing circuit 3 to start processing of the next line.

In a case where the reduction rate is less than 50%, the scaling processing circuit 5 simultaneously sends the filter processing circuit 3 a signal that indicates whether the next line of data is necessary or not. The filter processing circuit 3 refers to this signal. If the scaling processing circuit 5 indicates that the next line of data is necessary, the filter processing circuit 3 processes the next line; if the scaling processing circuit 5 indicates that the next line of data is unnecessary, then the filter processing circuit 3 omits processing of the next line and processes the data of the line that follows this line.

Figure 2:
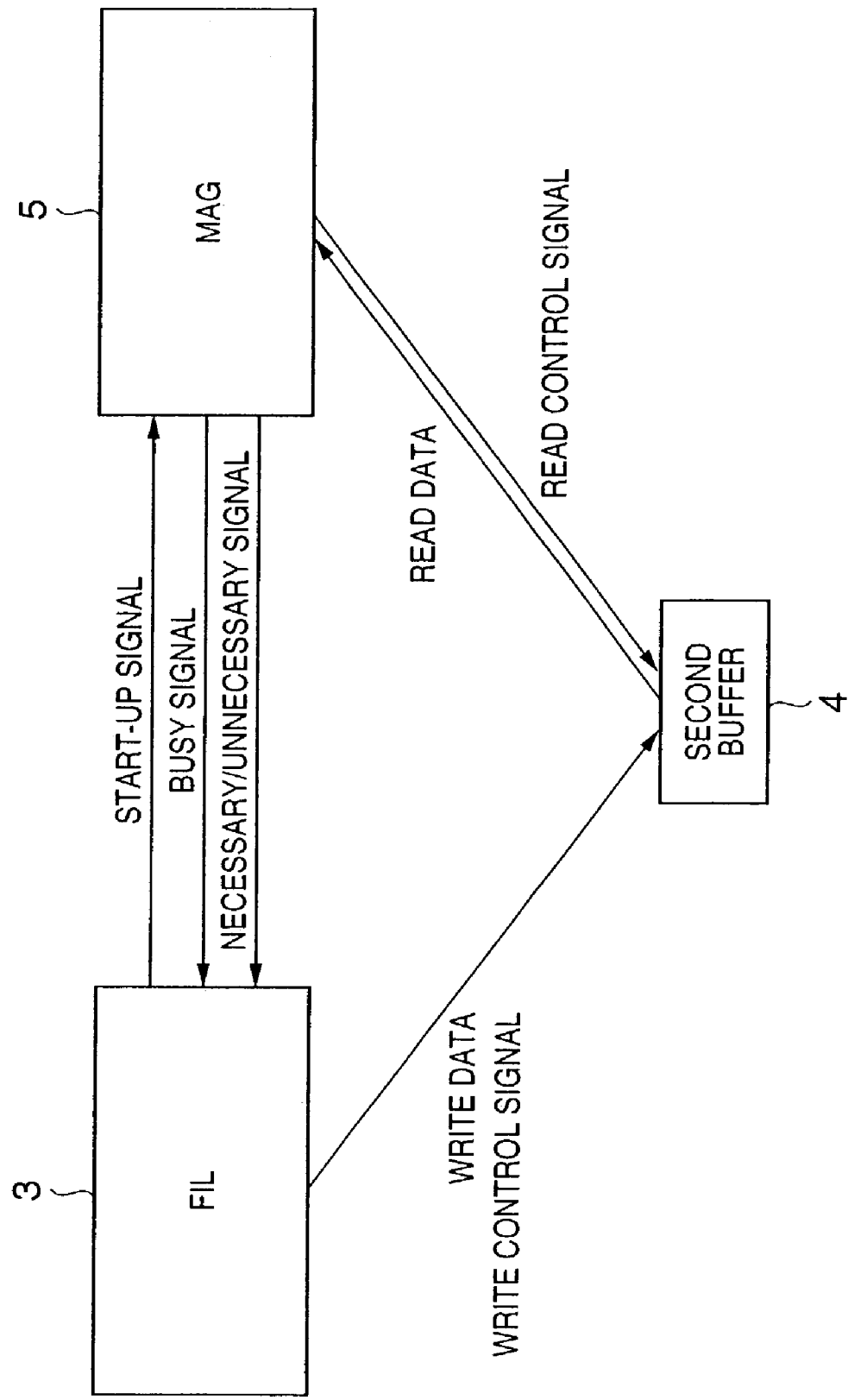
FIG. 2 is a detailed block diagram illustrating the main components of the block diagram of FIG. 1 as well as signals sent and received.

FIG. 2 is a diagram illustrating data and signals exchanged among the filter processing circuit 3, second buffer 4 and scaling processing circuit 5 constituting a main section 10 shown in FIG. 1.

The filter processing circuit 3 transmits write data to the second buffer 4 together with a write control signal. The scaling processing circuit 5 transmits a read control signal to the second buffer 4 which, upon receiving this signal, transmits read-in data to the scaling processing circuit 5. The filter processing circuit 3 transmits the start-up signal to the scaling processing circuit 5 whenever data is stored, and the scaling processing circuit 5 sends the filter processing circuit 3 the BUSY signal, which indicates that processing is in progress, and a necessary/unnecessary signal indicating whether the next line is necessary or not.

Figure 4:
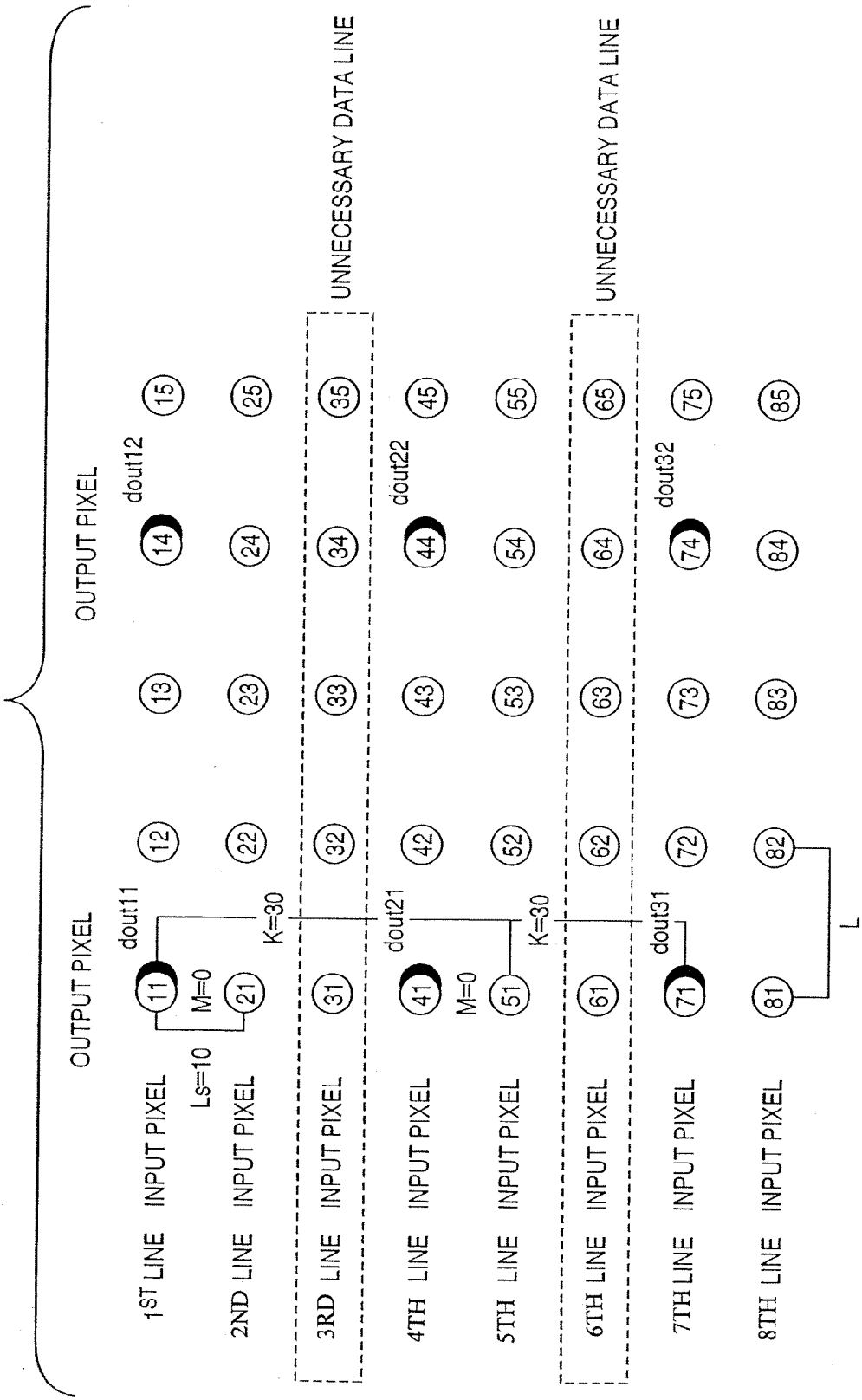
FIG. 4 is a first diagram illustrating the relationship between input and output pixels of a scaling conversion circuit according to the first embodiment.

FIG. 4 is a diagram illustrating the relationship between input and output pixels of the scaling processing circuit 5 according to this embodiment. Reference will be had to FIG. 4 to describe a method whereby the scaling processing circuit 5 determines whether the next line of data is necessary or unnecessary. The direction along which input pixels 11, 12, 13, . . . are arrayed is the main-scan direction. This direction is the direction in which the printhead is scanned. Further, the direction in which pixels 11, 21, 32, . . . are arrayed is the sub-scan direction. This direction is that in which the nozzles of the printhead are arrayed. This is also the direction in which the print medium is transported.

Here a case will be described in which the distance (L, Ls) between input pixels is 10 and size is reduced to 33.3%. The circle marks shown in FIG. 4 indicate pixel data, the higher order digit of the 2-digit number in each circle indicates the line number, and the lower order digit indicates the number of the item of data in that line. It should be noted that the reduction rate is decided by a value of resolution conversion or by magnification entered by the control/display panel (see FIG. 14). This value is set in the scaling processing circuit 5 via the CPU. Furthermore, the magnification covers a range of, e.g., 25 to 400%.

First, four pixel values of input image data, namely d11 (data of the first pixel of the first line), d12 (data of the second pixel of the first line), d21 (data of the first pixel of the second line) and d22 (data of the second pixel of the second line), are read out from the second buffer, and the output data dout11 is decided. Though the value of d11 is used here as is, the pixel value of dout11 may be decided by applying various interpolation processing to the four input pixel values.

Processing of data in the main-scan direction then proceeds. The data output next is data at a position having a distance of 30 from the starting pixel along the main-scan direction, where the distance is obtained as follows:

distance between output pixels=(input-pixel spacing)/
(magnification in main-scan direction)=10/
33.3%=30

Accordingly, the result is image data obtained from d14, d15, d24, d25. Though the data of d14 is adopted as being dout12 as is, the pixel value of dout12 may be decided by applying various interpolation processing to the four input pixel values.

Output pixels are decided in the main-scan direction in the manner dout13, dout14, . . . . After all output pixels of the first line are thus decided, processing is executed repetitively in the order of the second line, third line, . . . and so forth.

In a case where the reduction rate is less than 50%, it is determined whether the next line (here the third input line) is necessary. The determination is made as follows: Let M represent the position of dout11 in the sub-scan direction with respect to the first line, let N be a number that represents the line number of a target line inclusive of the line presently undergoing processing, let K represent the distance between output pixels in the sub-scan direction, and let Ls represent the distance between input pixels in the sub-scan direction. If $$K+M \geq N \times Ls \quad (1)$$

holds, it is determined that the next line of data is unnecessary. If $$K+M < N \times Ls \quad (2)$$

holds, it is determined that the next line of data is necessary.

In the example shown in FIG. 4, M=0, N=3, K=30, Ls=10 holds for the third line and therefore it is determined that the data of the third line is unnecessary because this situation conforms to Equation (1).

Thus, in a case where the scaling processing circuit 5 has determined that the next line of data is unnecessary, as shown in FIG. 12, the scaling processing circuit 5 cancels the BUSY signal applied to the filter processing circuit 3 and, at the same time, raises the necessary/unnecessary signal to the high level to so notify the filter processing circuit 3 that the data of the next line is unnecessary. In response, the filter processing circuit 3 omits processing of the next line (the third line).

When the above-described determination is made by the scaling processing circuit 5 with regard to the fourth line, we have M=0, N=4, K=30, Ls=10 and therefore it is determined that the data of the fourth line is necessary because this situation conforms to Equation (2). Accordingly, the scaling processing circuit 5 places the necessary/unnecessary signal indicating that the fourth line is necessary at the low level and sends this signal to filter processing circuit 3. When the processing of two lines, namely the fourth and fifth lines, is completed, the filter processing circuit 3 transmits the start-up signal to the scaling processing circuit 5. Upon receiving the start-up signal, the scaling processing circuit 5 processes the second line of the output.

Upon completion of the second line of the output, the position (M) in the sub-scan direction in a case where it is determined whether the next input line is necessary or not becomes the value of the position of dout21 in the sub-scan direction with respect to the fourth line of the input.

By repeating the above-described processing, an image in which the size of the input image has been reduced to 33.3% is obtained.

Figure 5:
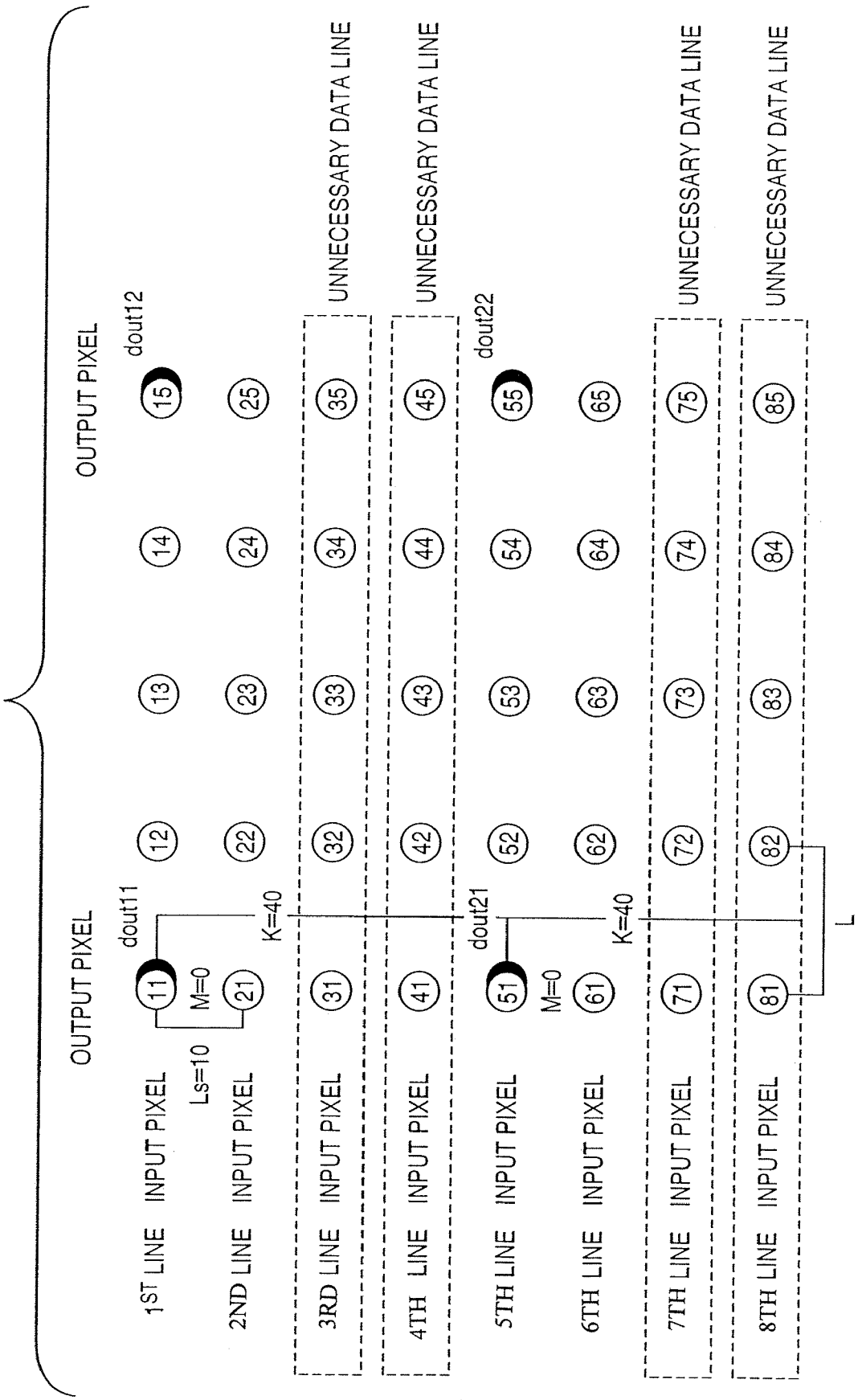
FIG. 5 is a second diagram illustrating the relationship between input and output pixels of a scaling conversion circuit according to the first embodiment.

Next, reference will be had to FIG. 5 to describe a method whereby the scaling processing circuit 5 determines whether the next line of data is necessary or unnecessary with regard to a case where image size is reduced to 25%. It will be assumed that other conditions are the same as those relating to FIG. 4.

First, four pixel values of input image data, namely d11, d12, d21, d22, are read out from the second buffer and the output data dout11 is decided. Though the value of d11 is used here as is, the pixel value of dout11 may be decided by applying various interpolation processing to the four input pixel values.

Processing of data in the main-scan direction then proceeds. The data output next is data at a position having a distance of 40 from the starting pixel along the main-scan direction, where the distance is obtained as follows:

distance between output pixels=(input-pixel spacing)/
(magnification in main-scan direction)=10/
25%=40

Accordingly, the result is image data obtained from d15, d16, d25, d26. Though the data of d15 is adopted as being dout12 as is, the pixel value of dout12 may be decided by applying various interpolation processing to the four input pixel values.

Processing of the first line of the output is thus completed. This is followed by determining whether the next line (the third input line) is necessary. This determination is made based upon conformity with either Equation (1) or (2) in a manner similar to that described above.

In the example shown in FIG. 5, M=0, N=3, K=40, Ls=10 holds for the third line and therefore it is determined that the data of the third line is unnecessary because this situation conforms to Equation (1). The scaling processing circuit 5 cancels the BUSY signal applied to the filter processing circuit 3 and, at the same time, notifies the filter processing circuit 3 by the necessary/unnecessary signal of the fact that the data of the third line is unnecessary. In response, the filter processing circuit 3 omits processing of the third line.

When the above-described determination is made by the scaling processing circuit 5 with regard to the fourth line, we have M=0, N=4, K=30, Ls=10 and therefore the situation conforms to Equation (1). Accordingly, the scaling processing circuit 5 sends the filter processing circuit 3 the necessary/unnecessary signal indicating that the fourth line of data is unnecessary. The filter processing circuit 3 responds by omitting processing of the fourth line.

When the above-described determination is made by the scaling processing circuit 5 with regard to the fifth line, we have M=0, N=5, K=40, Ls=10 and therefore it is determined that the data of the fifth line is necessary because this situation conforms to Equation (2). Accordingly, the scaling processing circuit 5 sends the filter processing circuit 3 the necessary/unnecessary signal indicating that the fifth line is necessary. When the processing of two lines, namely the fifth and sixth lines, is completed, the filter processing circuit 3 transmits the start-up signal to the scaling processing circuit 5. Upon receiving the start-up signal, the scaling processing circuit 5 processes the second line of the output.

Thus, with respect to a variety of magnifications, the scaling processing circuit 5 identifies unnecessary lines that are not used in scaling conversion processing, thereby making it possible to omit processing by the filter processing circuit 3.

Figure 9:
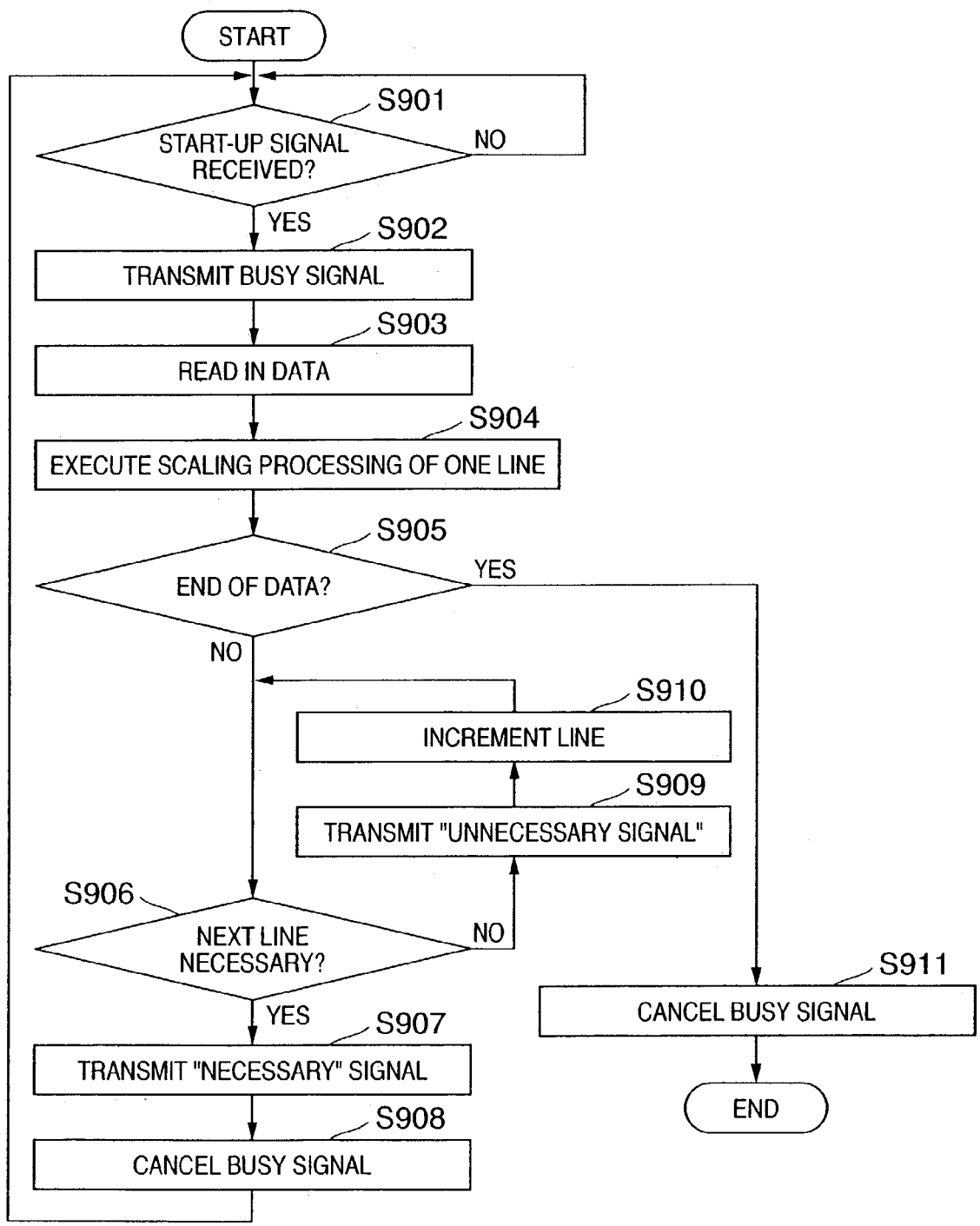
FIG. 9 is a flowchart illustrating the operation of the scaling processing circuit according to the first embodiment.

Processing executed by the scaling processing circuit 5 will be described again with reference to the flowchart of FIG. 9.

First, the scaling processing circuit 5 waits for receipt of the start-up signal from the filter processing circuit 3 (step S901). If the start-up signal is received, the scaling processing circuit 5 transmits the BUS signal (step S902), reads in data from the second buffer 4 and executes scaling processing of one line (step S904).

If scaling processing of one line ends, the scaling processing circuit 5 determines whether end of data to be processed has been reached (step S905). If data to be processed still remains, then the scaling processing circuit 5 determines whether the next line is necessary or not based upon Equations (1) and (2) above (step S906). If the next line is necessary, the scaling processing circuit 5 transmits a "necessary" signal to the filter processing circuit 3 (step S907), cancels the BUSY signal (step S908) and again waits for a start-up signal from the filter processing circuit 3.

If the next line is found to be unnecessary at step S906, on the other hand, then the scaling processing circuit 5 transmits the necessary/unnecessary signal to the filter processing circuit 3 (step S909), increments the line to undergo determination (step S910) and again determines at step S906 whether the next line is necessary or not.

If it is found at step S905 that there is no longer any data to be processed, then the scaling processing circuit 5.cancels the BUSY signal (step S911) and terminates processing.

The foregoing has been described taking as an example a case where scaling processing is executed as image processing. However, this processing is applicable also to image processing besides scaling processing, such as a grayscale conversion for obtaining output data using pixel values.

Figure 3:
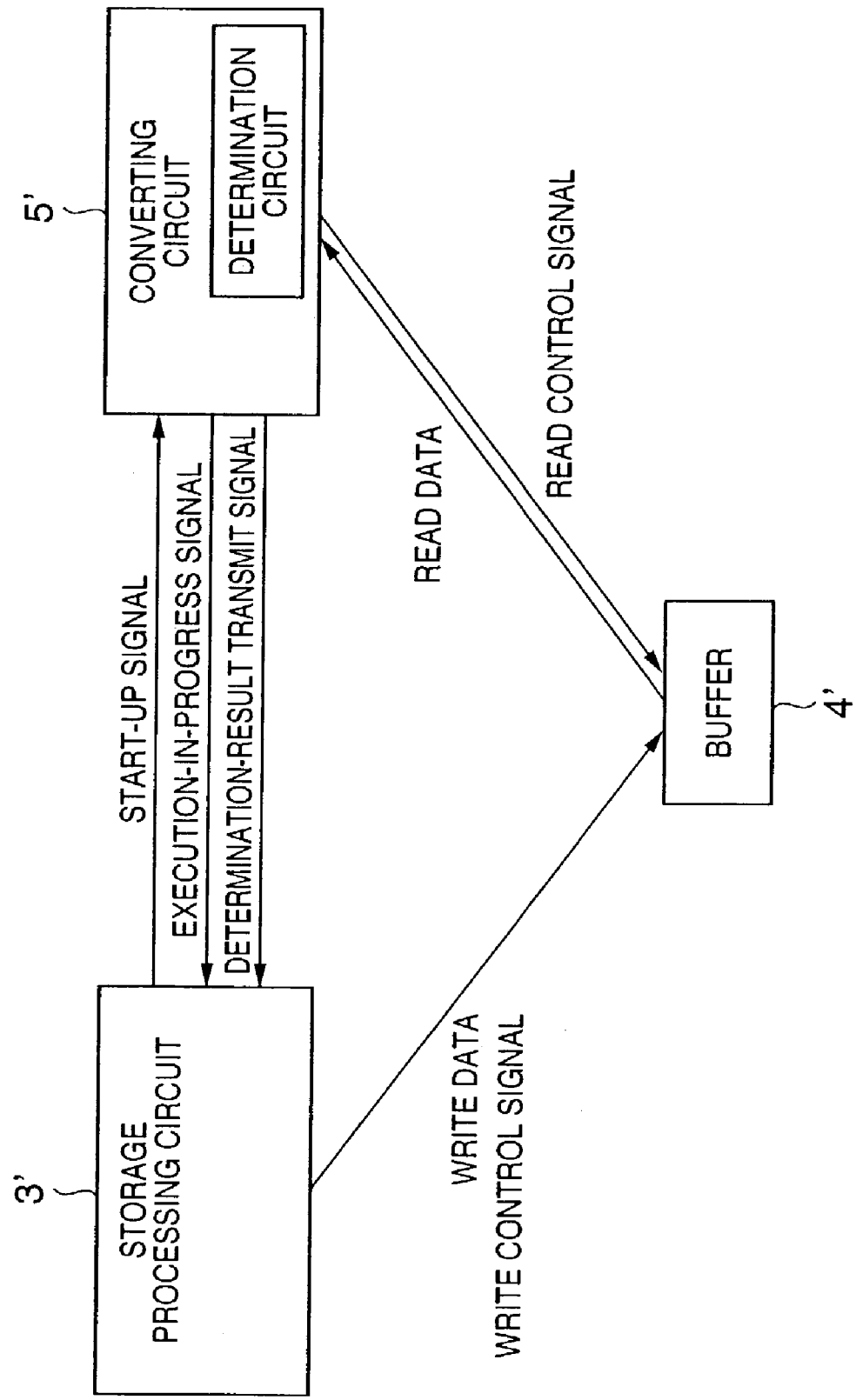
FIG. 3 is a detailed block diagram illustrating the main components of a modification of the first embodiment.

FIG. 3 is a diagram illustrating the main components of a modification of this embodiment in a manner similar to that of FIG. 2.

This modification has a storage processing circuit 3', a buffer 4' and a converting circuit 5', which obtains the value of a pixel at a position output from the values of a plurality of pixels, these circuits corresponding to the filter processing circuit 3, second buffer 4 and scaling processing circuit 5, respectively.

The storage processing circuit 3' transmits write data to the buffer 4' together with a write control signal. The converting circuit 5' transmits a read control signal to the buffer 4' which, in response to this signal, transmits read-in data to the converting circuit 5'. Further, the storage processing circuit 3' transmits the start-up signal to the converting circuit 5', and the converting circuit 5' sends the storage processing circuit 3' an execution-in-progress signal indicating execution of operation and a determination-result transmit signal indicating the result of a determination rendered by an internal determination circuit.

The determination circuit internally of the converting circuit 5' determines whether one set of data stored in the buffer 4' next by the storage processing circuit 3' is necessary in processing executed by the converting circuit 5'. The converting circuit transmits the result of this determination to the storage processing circuit 3' by the determination-result transmit signal. In accordance with the status of this signal, the storage processing circuit either executes or skips processing for storing the next set of data in the buffer 4'.

Thus, in accordance with this embodiment, as described above, it is determined whether a set of image data is used in processing such as processing for converting resolution or magnification. In a case where the reduction rate of image data is less than 50%, buffer storage of a set of image data not used in such processing can be omitted. As a result, the time needed for storing image data in the buffer can be shortened and, hence, so can the time needed for overall image processing.

By way of example, this embodiment is effective in a case where the resolution of image data is converted from 1200 dpi to 360 dpi and the reduction rate becomes 30%, and in a case where the resolution of image data is converted from 600 dpi to 360 dpi (reduction rate of 60%=60%) and 70% reduction processing is applied, whereby the total reduction rate becomes 42% (=60%×70%).

Second Embodiment

A second embodiment of the invention relates to an image processing apparatus similar to that of the first embodiment described above. Only the features that distinguish this embodiment will be described below, and a description of portions that are similar will be omitted.

Figure 6:
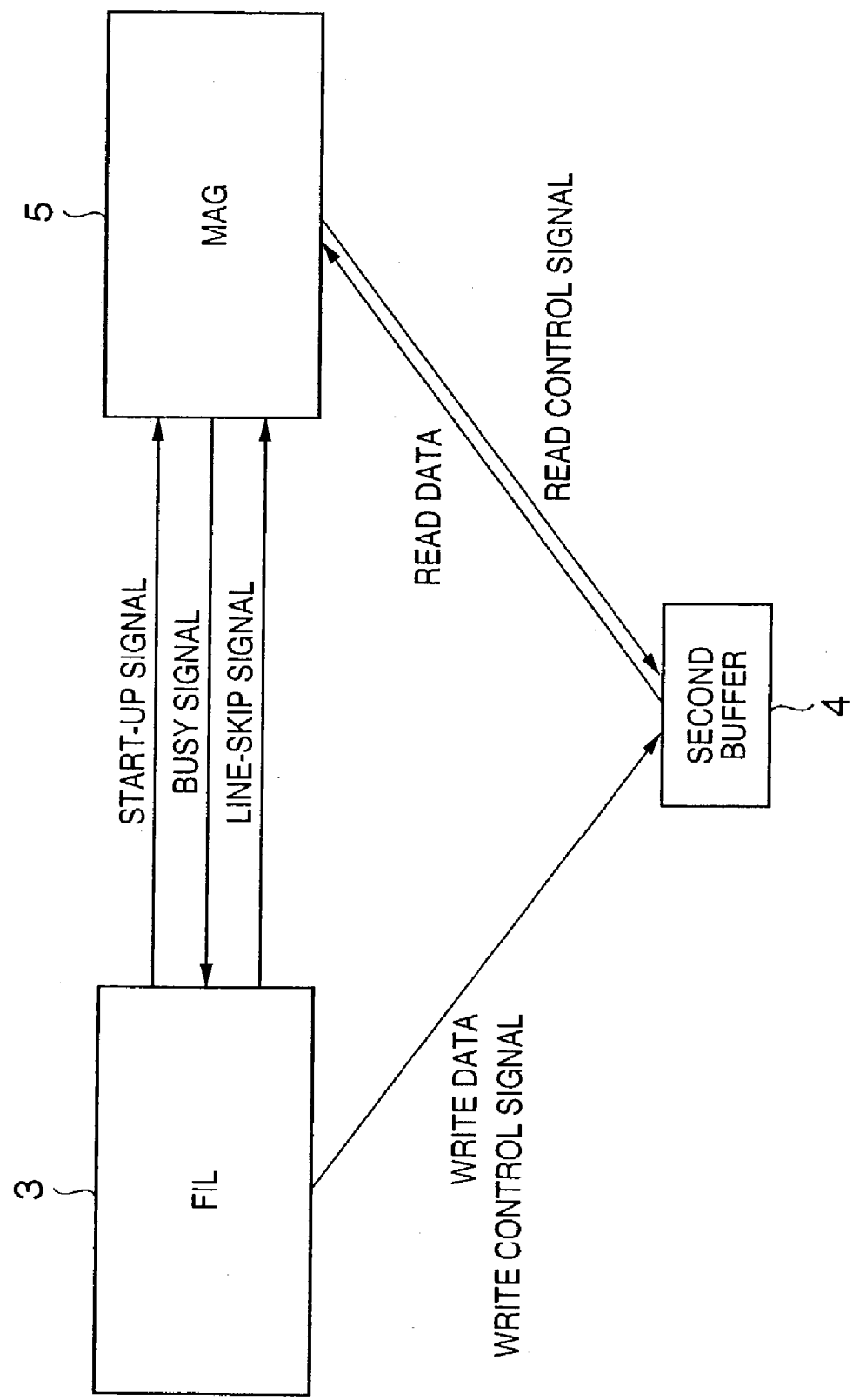
FIG. 6 is a detailed block diagram illustrating the main components of a second embodiment of an image processing apparatus according to the present invention.

FIG. 6 is a diagram illustrating the main components of the second embodiment in a manner similar to that of FIG. 2. In this embodiment, the determination as to whether a line of data is necessary in the scaling processing circuit 5 is made internally of the filter processing circuit 3 before the filter processing circuit 3 starts processing. In accordance with the determination made, execution of processing for this line is decided and the result is transmitted to the scaling processing circuit 5.

The filter processing circuit 3 transmits write data to the second buffer 4 together with a write control signal. The scaling processing circuit 5 transmits a read control signal to the second buffer 4 which, upon receiving this signal, transmits read-in data to the scaling processing circuit 5. The filter processing circuit 3 transmits the start-up signal to the scaling processing circuit 5 whenever two lines of data area stored, and transmits a line-skip signal to the scaling processing circuit 5 in a case where the next line is unnecessary. On the other hand, the scaling processing circuit 5 sends the filter processing circuit 3 the BUSY signal indicating that processing is in progress.

The determination made by the filter processing circuit 3 as to whether a line is necessary or not is made in accordance with conformity with either Equation (1) or (2) in a manner similar to that described above in connection with the first embodiment.

If the determination is that the next line is necessary, then the next line is processed in the usual manner. If the determination is that the next line is unnecessary, then processing of the next line is omitted, the filter processing circuit 3 transmits the line-skip signal to the scaling processing circuit 5 and then determines whether the line following this line is necessary or not. If two lines of data necessary in order for the scaling processing circuit 5 to execute processing have been stored in the second buffer 4, then the filter processing circuit 3 transmits the start-up signal to the scaling processing circuit 5.

After being sent the start-up signal from the filter processing circuit 3, the scaling processing circuit 5 executes magnification conversion processing using the two lines of data that have been stored in the second buffer 4 and, in the meantime, transmits the BUSY signal to the filter processing circuit 3.

Figure 7:
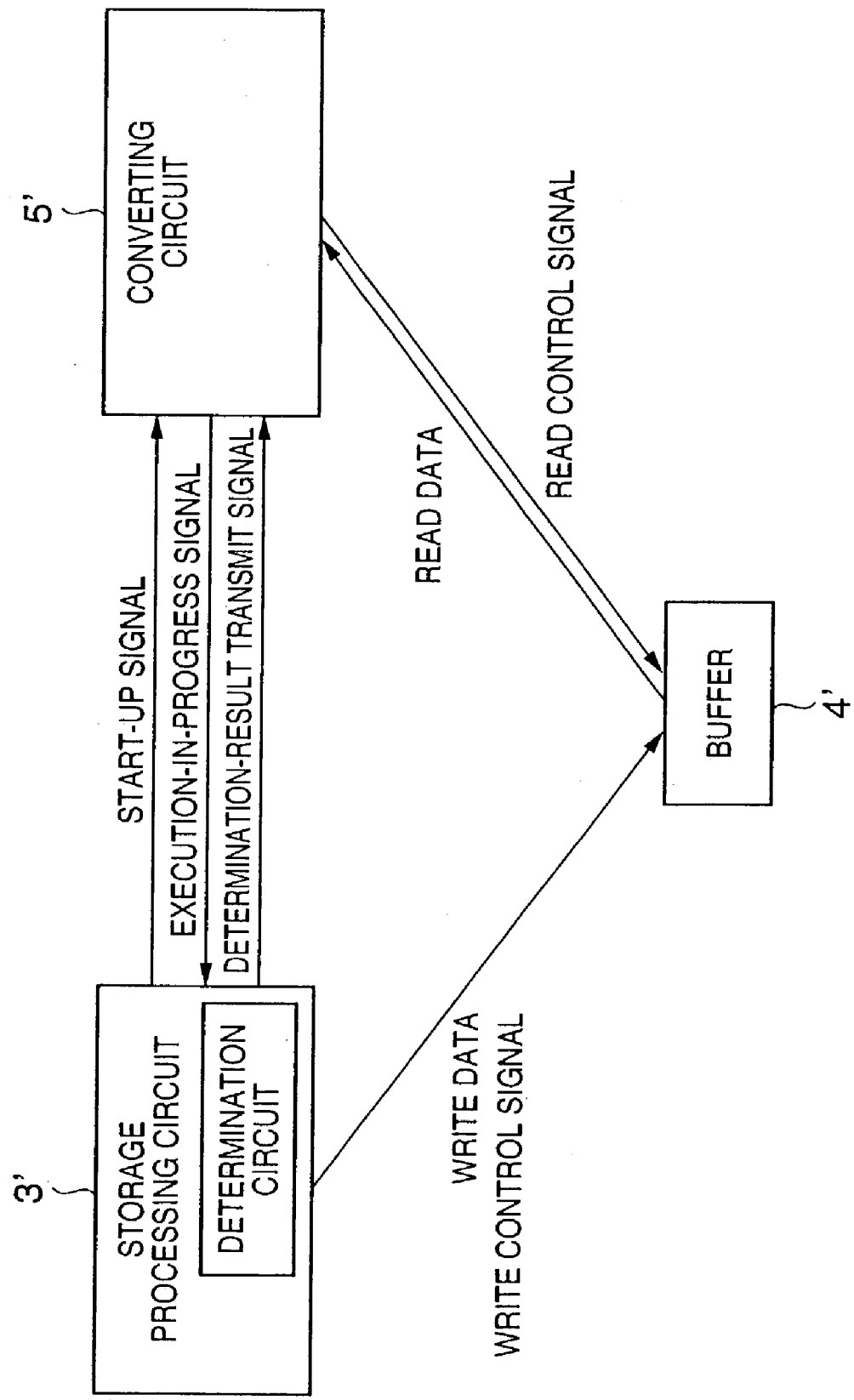
FIG. 7 is a detailed block diagram illustrating the main components of a modification of the second embodiment.
Figure 8:
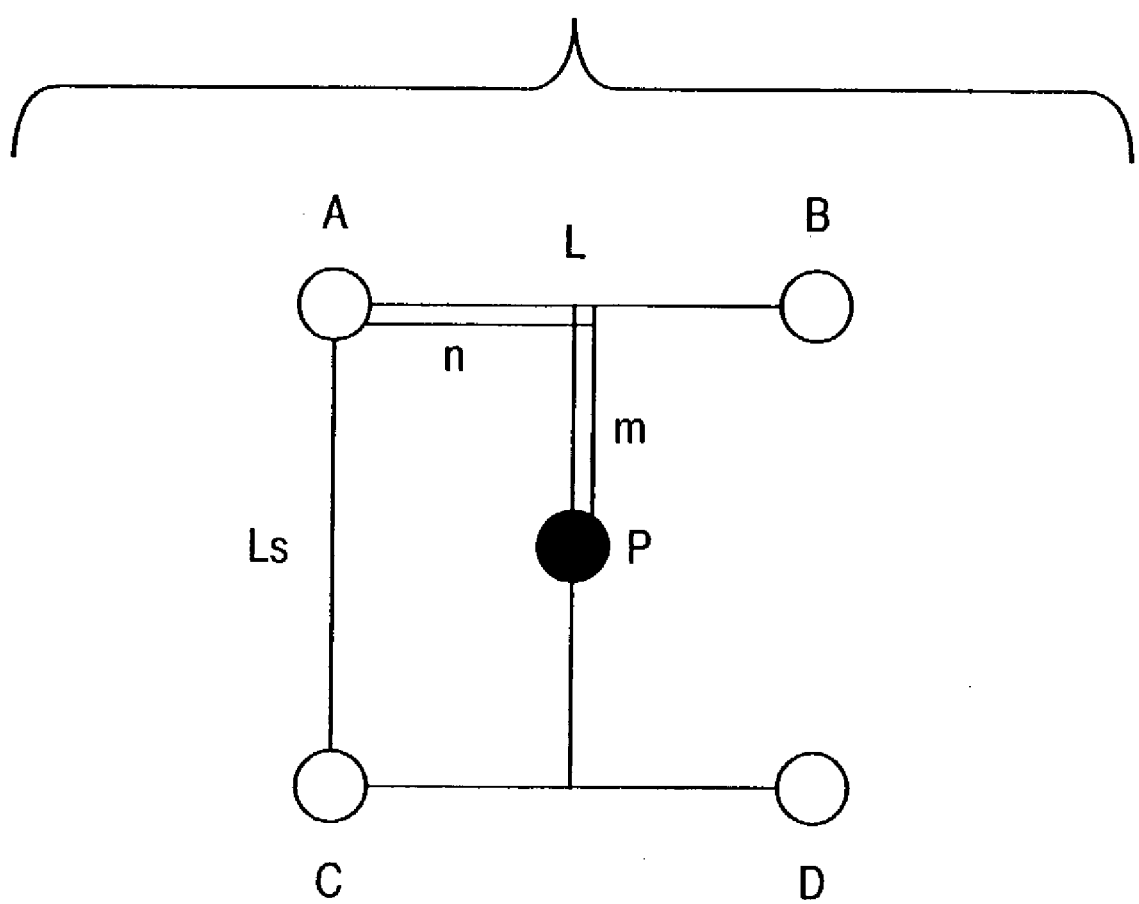
FIG. 8 is a diagram illustrating the positional relationship between input and output pixels in conversion processing.

This embodiment is applicable to processing other than the scaling processing described above. FIG. 7 is a diagram illustrating the main components of a modification of this embodiment in a manner similar to that of FIG. 6.

This modification has the storage processing circuit 3', the buffer 4' and the converting circuit 5', which obtains the value of a pixel at a position output from the values of a plurality of pixels, these circuits corresponding to the filter processing circuit 3, second buffer 4 and scaling processing circuit 5, respectively.

The storage processing circuit 3' transmits write data to the buffer 4' together with a write control signal. The converting circuit 5' transmits a read control signal to the buffer 4' which, in response to this signal, transmits read-in data to the converting circuit 5'. Further, the storage processing circuit 3' sends the converting circuit 5' the start-up signal and a determination-result transmit signal indicating the result of a determination rendered by an internal determination circuit. The converting circuit 5' sends the storage processing circuit 3' an execution-in-progress signal indicating execution of operation.

The determination circuit internally of the storage processing circuit 3' determines whether the next set of data stored is necessary in processing executed by the converting circuit 5'. The storage processing circuit 3' transmits the result of this determination to the converting circuit 5' by the determination-result transmit signal. In accordance with the status of this signal, the converting circuit 5' either executes or skips processing for storing the next set of data in the buffer 4'.

Thus, in accordance with this embodiment, as described above, it is determined whether a set of image data is used in processing such as processing for converting resolution or magnification, and buffer storage of a set of image data not used in such processing can be omitted. As a result, the time needed for storing image data in the buffer can be shortened and, hence, so can the time needed for overall image processing.

Third Embodiment

A third embodiment of the invention relates to an image processing apparatus similar to that of the first and second embodiments described above. Only the features that distinguish this embodiment will be described below, and a description of portions that are similar will be omitted.

In the first and second embodiments, whether data is necessary in scaling processing is determined line by line. In this embodiment, time concerning the determination can be shortened by obtaining the number of unnecessary lines from the magnification.

In this embodiment, the following:

$$\{[(K+M)/Ls]-2\} \qquad (3)$$

is found instead of Equations (1) and (2) used in the first and second embodiments, the integral part of this value is judged to be the number of unnecessary lines, and processing is executed upon skipping the applicable number of lines that follow the line presently being processed.

Assume that the conditions indicated in the sample of the first embodiment apply. Specifically, in case of a scaling factor of 33.3%, we have K=30, M=0, Ls=10, and therefore the value of Equation (3) is 1. Hence it will be understood that only the next line following the two lines stored in the second buffer 4 is unnecessary.

Further, in case of a scaling factor of 25%, we have K=40, M=0, Ls=10, and therefore the value of Equation (3) is 2. Hence it will be understood that the next two lines following the two lines stored in the second buffer 4 are unnecessary.

A case where scaling processing is executed using two lines of image data has been described. However, if the number of lines used in scaling processing is other than two, the number of lines used would be employed instead of the final number "2" in Equation (3).

In accordance with this embodiment, as described above, it is possible to readily determine the number of consecutive lines that become unnecessary when the size of an image is reduced. As a result, data not used in processing when the size of an image is reduced by a great amount can be recognized at one time, time required to store the data in a buffer can be reduced and so can the time required for overall processing.

Other Embodiments

In the embodiments described above, the resolution of the printhead is not limited to 360 dpi; the resolution may be 600 dpi or 1200 dpi if desired. Further, the reading resolution (input resolution) of the scanner may be, e.g., 2400 dpi, etc.

Further, N-valued processing (e.g., 3- or 4-valued processing) may be employed instead of binarization processing.

With regard to conversion of resolution, the invention is not limited to a 600-to-360-dpi conversion. The invention is applicable even in a case where a 1200-to-600-dpi conversion, for example, is made.

The determination as to whether a series of data such as line data is necessary when scaling processing or the like is executed is performed by means for storing data in a buffer or by means for executing the scaling processing. However, means for making the determination can be provided in both the means for executing storage processing and the means for executing scaling processing. This will make it possible to eliminate the signal sent between both means to indicate the result of the determination.

In this case, if the processing for writing data to the buffer and the processing reading out data from the buffer are executed in parallel, the determination processing can be executed immediately before the start of each of these processes and the processing executed next can be decided based upon the result. This means that there will be no time lag in the result of the determination and, hence, processing can be executed more efficiently.

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowchart (FIG. 9) is to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. An image processing apparatus for applying image processing to image data entered from image input means, and outputting processed image data to printing means, said apparatus comprising:
   masking means for correcting data input by said image input means;
   first storage means having r-number of line memories;
   first storage control means for storing data corrected by said masking means in said first storage means, and outputting a start instruction to filter means at every data storing operation to said first storage means;
   filter means for executing a filter processing using the data stored in said first storage means in accordance with the start instruction;
   second storage means having s-number of line memories for storing data that has undergone the filter processing by said filter means;
   second storage control means for storing data in said s-number of line memories in order whenever the filter processing is executed by said filter means; and
   scaling means for applying scaling processing to data read out pixel by pixel from said second storage means in accordance with a command from said filter means,
   wherein said scaling means determines whether data of next one line is necessary or unnecessary based on a scaling ratio in a case reduction scaling is executed and outputs necessary notification or unnecessary notification to said filter means based on the determination result, and
   wherein said filter means does not execute the filter processing when said filter means received the unnecessary notification.

2. The apparatus according to claim 1, further comprising: third storage means having t-number of line memories; and output means for outputting data, which has been stored in the t-number of line memories, to the printing means.

3. The apparatus according to claim 1, wherein the printing means is a printing unit for printing on a print medium by scanning a printhead that ejects ink.

4. The apparatus according to claim 1, wherein said scaling means output the unnecessary notification before said first storage control means output the start instruction to said filter means.

5. The apparatus according to claim 1, wherein said scaling means output a busy signal to said filter means until the scaling processing is finished.

6. The apparatus according to claim 1, wherein said filter means executes at least edge emphasis processing or smoothing processing.

* * * * *